Aug. 26, 1969   A. W. NUCCEL   3,463,030
ANTI-BACKLASH GEAR REDUCER
Filed May 6, 1968   2 Sheets-Sheet 2
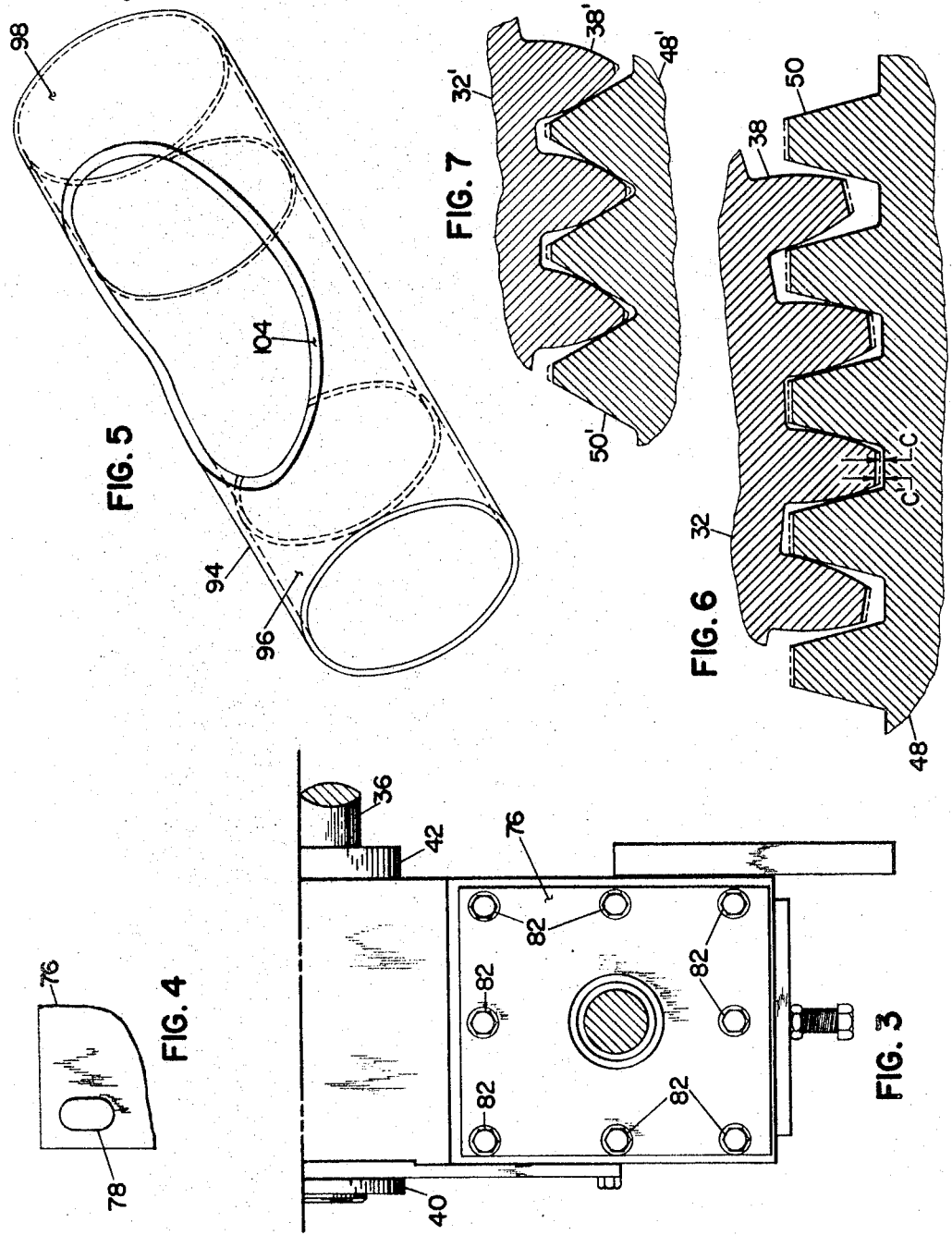
INVENTOR.
ALBERT W. NUCCEL United States Patent Office 3,463,030
Patented Aug. 26, 1969

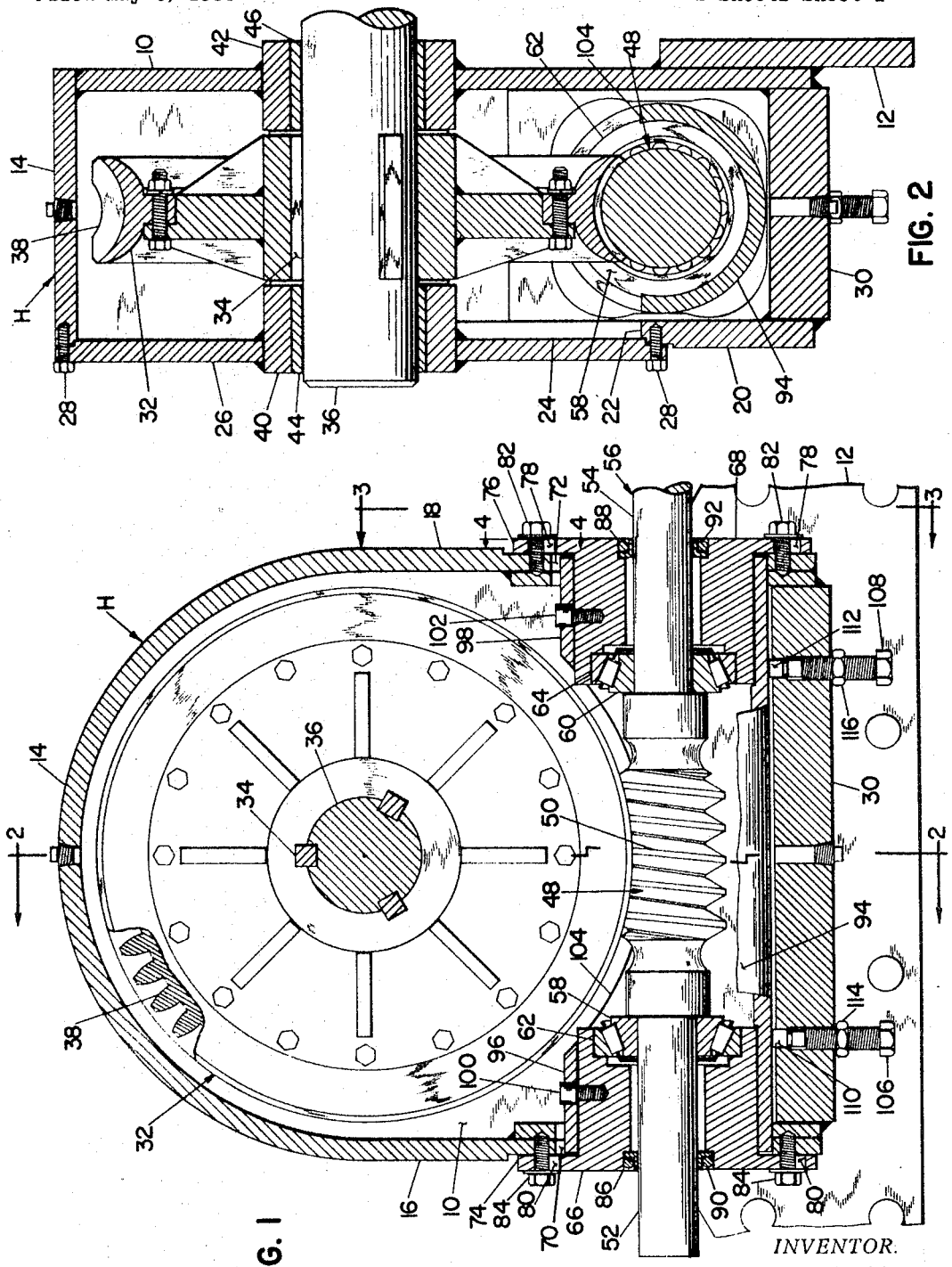

3,463,030
ANTI-BACKLASH GEAR REDUCER
Albert W. Nuccel, Harrisburg, Pa., assignor, by mesne assignments, to Teledyne Inc., Los Angeles, Calif., a corporation of Delaware
Filed May 6, 1968, Ser. No. 726,744
Int. Cl. F16h 35/06, 55/24
U.S. Cl. 74—409                                9 Claims

ABSTRACT OF THE DISCLOSURE

An anti-blacklash worm gear reducer in which both the worm and the worm gear are formed with their addendums sufficiently smaller than their dedendums to provide in the assembled worm and worm gear between the top of the worm gear teeth and the bottom of the worm thread and between the top of the worm thread and the bottom of the worm gear teeth, not only the conventional working clearance necessary to allow for imperfections in workmanship so that the worm and worm gear will mesh at their pitch circle with zero or minimal backlash, but also a substantial additional clearance whereby when backlash due to wear on the teeth and threads occurs, such backlash can be eliminated by adjustment means associated with the worm. The adjustment means includes a cartridge in which the bearings for the worm shaft are mounted, the cartridge being supported at its ends in plate members releasably secured to the side walls of the gear reducer housing, and including means for adjusting the cartridge and plate members as a unit for controlling movement of the worm in a direction solely radially of the worm gear.

Background of the invention

In apparatus embodying worm gear reducers, where the operations to be performed require a high degree of precision it is essential that zero or minimal backlash between the worm and worm gear of the reducer be maintained. For example, in power operated turning roll apparatus for supporting and continuously turning large cylindrical workpieces in automatic welding operations, such as welding seams in cylindrical vessels, it is essential that such vessels be turned at a steady uniform rate, since any irregular or hesitant turning of such vessels will cause irregular deposition of metal by the welding electrode along the seam to be welded. In such apparatus the drive means for the turning rolls includes worm gear reducers for rotating the turning rolls at a comparatively slow speed, thus it will be seen that a very small backlash between the worm and worm gear of the reducer is multiplied many times on the surface of a large cylindrical workpiece where the seam is being welded, resulting in a highly objectionable degree of hesitation and jerking rotational movement of the workpiece with a consequent inferior weld.

The present invention relates to worm gear reducers constructed and arranged to render backlash between the worm and its associated worm gear negligible when initially assembling the parts of the gear reducer and for restoring zero or negligible backlash when through wear on the teeth and thread of the worm gear and worm backlash develops.

Summary of the invention

In the present worm gear reducer, the worm gear is rotatably mounted in fixed position in the worm gear reducer housing and means is provided for adjustably supporting the opposite end portions of the worm shaft from the housing for adjusting the center distance between the worm gear and the worm to provide zero or minimal backlash when wear on the teeth and threads of the worm gear and worm occurs. To permit of such adjustment the dimensions of the addendums of both the worm gear and the worm are reduced with respect to the dedendums thereof to provide a substantially greater clearance between the top of the worm gear teeth and the bottom of the worm thread and between the top of the worm thread and the bottom of the worm gear teeth than the working clearance conventionally allowed to permit the teeth of the worm gear to roll out of the thread of the worm without binding and to compensate for such imperfections and inaccuracies in workmanship that would preclude meshing of the worm gear and worm at their pitch circles with zero or minimal backlash. In the present construction the substantial additional clearance provides for adjustment of the worm gear and worm to insure meshing engagement thereof at their pitch circles with zero backlash even though imperfections and inaccuracies in workmanship may have dissipated the conventional working clearance. It is consequently an object of the invention to provide a worm gear reducer constructed and arranged to provide adjustment of the worm relative to the worm gear that insures zero or minimal backlash when wear of the teeth and threads of the worm gear and worm develops.

Rotatably adjustable sleeves having eccentric bores for receiving the shaft of a worm have previously been suggested for adjusting the center distance between a worm gear and a worm, however, such adjustments produce a concomitant transverse displacement of the worm laterally with respect to the worm gear causing misalignment of the worm gear and worm. Another object of the invention is to provide adjusting means whereby the worm gear is adjusted solely in a direction radially of the worm gear to maintain the worm gear and worm in perfect alinement.

Another object is to provide improved adjusting means as set forth above insuring perfect alignment of the bearings of the worm shaft when adjustments are made, precluding uneven wear and premature destruction of the bearings incident to misalignment thereof.

Other objects and advantages of the invention will be hereinafter pointed out or will become apparent from the following description when read in conjunction with the accompanying drawings.

Brief description of the drawings

FIGURE 1 is a central vertical sectional view through the gear reducer embodying the invention, with parts shown in elevation;

FIGURE 2 is a sectional view taken on line 2—2 of FIGURE 1;

FIGURE 3 is a view taken on line 3—3 of FIGURE 1;

FIGURE 4 is an enlarged fragmentary view taken on line 4—4 of FIGURE 1;

FIGURE 5 is a pictorial view of the cartridge for the worm shaft bearing supports;

FIGURE 6 is a fragmentary sectional view showing on an enlarged scale the meshing of the teeth and thread of the worm gear and worm at a pressure angle of 15°; and FIGURE 7 is a view similar to that of FIGURE 6 with the teeth and thread at a pressure angle of 30°.

Description of the preferred embodiment

Referring now to the drawings, and more particularly to FIGURES 1 and 2, the gear reducer includes a housing H having a back wall 10 that in outline is generally inverted U-shaped. The lower portion of the housing back wall 10 may be conveniently secured in any suitable manner, as by welding, to a bracket 12 for mounting the gear reducer on the apparatus, not shown, in conjunction with which it is to be used. The housing H is provided with a semi-circular top wall 14 and opposed straight side walls 16 and 18, preferably formed as an integral unit secured in suitable manner, as by welding, to the backwall 10. The lower portion of the housing H is provided with a front wall 20 secured in suitable manner, as by welding, to the front ends of the housing straight side walls 16 and 18. The upper edge of the front wall 20 is formed with a semi-circular recess 22 defining with the front edge of the semi-circular top wall 14 a large circular access opening 24 adapted to be closed by means of a removable cover plate 26, the cover plate 26 being secured to the front wall 20 and top wall 14 by a plurality of cap screws 28. The housing H is completed by a bottom plate 30 secured in suitable manner, as by welding, to the lower ends of the housing side walls 16 and 18, back wall 10 and front wall 20.

Disposed in the upper portion of the housing H is a worm gear 32 keyed as at 34 to an output shaft 36. The worm gear 32 is provided with the involute teeth 38. Extending through and suitably secured, as by welding, to the cover plate 26 and back wall 10 of the housing H are axially aligned sleeve bearings 40 and 42 carrying bushings 44 and 46 in which the shaft 36 is rotatably mounted.

The worm gear 32 meshes with a worm 48 disposed in the lower portion of the housing H centrally between the side walls 16 and 18. The worm 48 is provided with an involute thread 50. Opposite end portions 52 and 54 of the shaft 56 of the worm 48 extend through and are rotatably mounted in anti-friction bearings 58 and 60 seated in annular recesses 62 and 64 formed in the inner ends of the tubular bearing supports 66 and 68.

The bearing supports 66 and 68 extend through enlarged axially aligned openings 70 and 72 in the lower portions of housing side walls 16 and 18 and are arranged to be adjustably secured to the housing side walls 16 and 18 for limited movement in a solely vertical direction. For this purpose the outer ends of the bearing supports 66 and 68 have integrally formed therewith or welded thereto radially outwardly extending flanges 74 and 76 overlying and seating against the outer face portions of the housing side walls 16 and 18 bounding the enlarged openings 70 and 72 therein. Referring to FIGURE 1, the flange 76 is provided with a plurality of vertically elongated slots 78 and the flange 74 is provided with a plurality of similar vertically elongated slots 80. FIGURE 4 shows one of the slots 78 in the flange 76, it being understood that all the slots 78 and 80 are similarly formed. Cap screws 82 and 84 extend through the slots 78 and 80 and are threaded in the housing side walls 18 and 16, which cap screws when tightly drawn up secure the bearing supports 68 and 66 to the housing side walls 18 and 16. The diameter of the cap screws 82 and 84 and the width of the vertically elongated slots 78 and 80 are such as to limit adjustment of the bearing supports solely in a vertical direction. The outer ends of the bearing supports 66 and 68 are formed with annular recesses 86 and 88 in which are seated oil seals 90 and 92 encircling the shaft portions 52 and 54 to prevent loss of lubricant and ingress of foreign matter.

The means for adjusting the bearing supports 66 and 68 includes a tubular cartridge 94 disposed in the lower portion of the housing H terminating at its ends in the enlarged openings 70 and 72 of the housing 16 and 18. The end portions 96 and 98 of the tubular cartridge 94 have an inside diameter to snugly embrace the bearing supports 66 and 68, and an outside diameter substantially smaller than the diameter of the openings 70 and 72 of the housing side walls 16 and 18, into which openings the ends of the cartridge 94 extend. Hex socket head cap screws 100 and 102 extending through the cartridge end portions 96 and 98 and threaded into the bearing supports 66 and 68, prevent relative rotational and axial movement between the cartridge 94 and the bearing supports 66 and 68.

The cartridge 94 is provided in its upper peripheral portion, centrally between the ends of the cartridge 94, with an arcuate recess. The recess 104 has a depth and longitudinal extent to permit entry of the lower peripheral portion of the worm gear 32 into the cartridge 94 for full engagement of the teeth 38 of the worm gear 32 with the thread 50 of the worm 48 in any vertically adjusted position of the bearing supports 66 and 68.

A pair of adjusting screws 106 and 108 spaced longitudinally of the cartridge 94 are threaded in the housing bottom plate 30 from the bottom side thereof, and are provided at their inner ends with unthreaded stem portions 110 and 112 projecting into the housing H for engagement with the lower peripheral portion of the cartridge 94.

The worm gear and worm have the same diametral pitch and, as shown in FIGURE 6, the teeth 38 of the worm gear 32 and the thread 50 of the worm 48 are designed so that the worm gear 32 and the worm 48 can be brought into full meshing engagement at their pitch circles with zero backlash. The teeth and thread are shown in FIGURE 6 with a 15° pressure angle, however, the pressure angle may be varied, there being shown in FIGURE 7 teeth 38' of a worm gear 32' and a thread 50' of a worm 48' having a 30° pressure angle.

As a result of wear on the worm gear teeth and/or wear on the thread of the worm, backlash develops between the worm gear and worm which, as previously pointed out, is highly undesirable where the reducer is used in conjunction with apparatus requiring a high degree of precision.

In order to permit the teeth of the worm gear to roll out of the thread of the worm without binding or bottoming when in full meshing engagement with zero backlash, the worm gear and the worm are formed with the addendum of the worm gear teeth and the worm thread smaller than the dedendum of the worm gear teeth and the worm thread to provide a clearance. Conventionally, the addendum is determined by the formula, $$\text{addendum} = \frac{1}{\text{diametral pitch}}$$

and the dedendum is determined by the formula, $$\text{dedendum} = \frac{1.157}{\text{diametral pitch}}$$

The difference between the dedendum and addendum provides a conventional clearance, represented in FIGURE 6 at C, providing zero backlash when the teeth of the worm gear and the thread of the worm are brought into full meshing engagement and that permits the worm gear teeth to roll out of the worm thread without binding. However, when substantial wear on the worm gear teeth and/or worn thread develops, resulting in backlash, such conventional clearance is insufficient to permit substantial adjustment of the worm in a vertical direction sufficiently closer to the worm gear to bring the worm gear teeth and worm thread into full engagement with zero backlash and that will at the same time permit the worm gear teeth to roll out of the worm thread without binding.

In order to provide for substantial adjustment of the worm relative to the worm gear to restore zero backlash as wear on the worm gear teeth and/or worm thead develops, I reduce the addendum of the worm gear teeth and the addendum of the worm thread from the conventional addendum as determined by the above formula to provide a substantially increased clearance, preferably about a 30% increased clearance, represented in FIGURE 6 at C'.

When as a result of wear on the worm gear teeth and/or worm thread backlash develops, adjustment of the worm 48 closer to the axis of the worm gear 32 to restore them into full meshing engagement with zero backlash is accomplished by first loosening the cap screws 84 and 82 that secure the bearing supports 66 and 68 to the housing side walls 16 and 18. The adjusting screws 106 and 108 are now turned in the proper direction to raise the cartridge 94 whereby the cartridge 94, the bearing supports 66 and 68, the bearings 58 and 60, the worm shaft 56 and worm 48 are raised as a unit to bring the worm gear and worm into full meshing engagement with zero backlash. In order to provide fine adjustment of the worm relative to the worm gear, the theaded portions of the adjusitng screws 106 and 108 are of fine gauge, preferably about 50 threads per inch.

After the proper adjustment has been made, the jamb nuts 114 and 116 are drawn up tightly against the bottom plate 30 of the housing H and the cap screws 84 and 82 are drawn up tightly against the bearing support flanges 74 and 76 to retain the worm adjusting assembly in adjusted position.

It will be seen that the above described adjusting means retains the worm and worm gear in perfect alignment thereby insuring full engagement between the worm and worm gear across the full width of the face of the worm gear teeth, to distribute wear evenly across the full width of the face of the worm gear teeth. This is not possible in such prior constructions employing eccentric devices since in such devices, adjustment of the center distance between the worm and worm gear is necessarily accompanied with an axially lateral displacement of the worm relative to the worm gear, resulting in shortening the line of contact between the worm and worm gear with consequent excessive and uneven wear along such shortened contact line, and which becomes progressively worse as successive adjustments are made in attempting to correct for backlash.

It will be further observed that the provision of the adjustable cartridge is which the bearing supports for the worm shaft are mounted insure perfect alignment of the bearings when adjustments are made, precluding uneven wear and premature destruction of the bearings incident to misalignment thereof.

I claim:
1. In a gear reducer;
a housing;
a worm gear rotatably mounted in said housing;
a worm shaft in said housing with opposite ends of said shaft projecting through enlarged axially aligned openings in opposed walls of said housing and provided between its ends with a worm arranged for meshing engagement with said worm gear;
a tubular cartridge extending between said opposed walls in surrounding spaced relation with respect to said worm and worm shaft, said cartridge having a recess in a peripheral portion thereof providing for entry of said worm gear into meshing engagement with said worm;
bearing supports for the opposite ends of said worm shaft fixedly mounted in opposite end portions of said cartridge against relative longitudinal and rotational movement with respect to said cartridge;
adjusting screw means threaded in said housing engageable with said cartridge to move said cartidge, bearing supports, worm shaft and worm as a unit for adjusting the center distance between said worm and worm gear as wear occurs solely along the radial axis of said gear to effect full meshing engagement therebetween with zero backlash.

2. A gear reducer in accordance with claim 1 wherein the relation of the addendum of the worm gear teeth and the worm thread with respect to their dedendum is such as to provide a substantially greater clearance than the clearance necessary to permit the worm gear teeth to roll out of the worm thread without binding to permit of substantial adjustment of the worm relative to the worm gear as wear on said teeth and thread occur to effect full meshing engagement therebetween with zero backlash.

3. In a gear reducer;
a housing;
a worm gear rotatably mounted in the upper portion of said housing;
a worm shaft in the lower portion of said housing with opposite ends of said shaft projecting through enlarged axially aligned openings in opposed walls of said housing and provided between its ends with a worm arranged for meshing engagement with said worm gear;
a tubular cartridge extending between said opposed walls in surrounding relation with respect to said worm and worm shaft, said cartridge having a recess in its upper peripheral portion providing for entry of said worm gear into meshing engagement with said worm;
bearing supports for the opposite ends of said worm shaft disposed in opposite end portions of said cartridge;
adjusting screw means threaded through the bottom of said housing engageable with said cartridge to move said cartridge and bearing supports for adjusting the center distance between said worm and worm gear as wear occurs to effect full meshing engagement therebetween with zero backlash;
and releasable means for rigidly securing said bearing supports to said opposed housing walls in said adjusted positions.

4. In a gear reducer;
a housing;
a worm gear rotatably mounted in the upper portion of said housing;
a worm shaft in the lower portion of said housing with opposite ends of said shaft projecting through enlarged axially aligned openings in opposed walls of said housing and provided between its ends with a worm arranged for meshing engagement with said worm gear;
a tubular cartridge extending between said opposed walls in surrounding relation with respect to said worm and worm shaft, said cartridge having a recess in its upper peripheral portion providing for entry of said worm gear into meshing engagement with said worm;
bearing supports for the opposite ends of said worm shaft disposed in opposite end portions of said cartridge;
adjusting screw means threaded through the bottom of said housing engageable with said cartridge to move said cartridge and bearing supports for adjusting the center distance between said worm and worm gear as wear occurs to effect full meshing engagement therebetween with zero backlash;
and means adjustably securing said bearing supports on said opposed housing walls for movement in a direction restricting adjustment of said worm in a solely radial direction with respect to the axis of said worm gear.

5. In a gear reducer;
a housing;
a worm gear rotatably mounted in the upper portion of said housing;
a worm shaft in the lower portion of said housing with opposite ends of said shaft projecting through enlarged axially aligned openings in opposed walls of said housing provided between its ends with a worm arranged for meshing engagement with said worm gear;
a tubular cartridge disposed in spaced surrounding relation with respect to said worm and worm shaft and extending into said enlarged openings, the outer diameter of said tubular cartridge being substantially smaller than the diameter of said enlarged openings, said cartridge having a recess in its upper peripheral portion providing for entry of said worm gear into meshing engagement with said worm;

bearing supports for the opposite ends of said worm shaft disposed in opposite end portions of said cartridge;

adjusting screw means threaded through the bottom of said housing engageable with said cartridge to move said cartridge and bearing supports for adjusting the center distance between said worm and worm gear as wear occurs to effect full meshing engagement therebetween with zero backlash;

and means for securing said bearing supports and cartridge in adjusted position including a radially extending flange on the outer end of each of said bearing supports disposed to overlie a respective one of said opposed walls, said flanges having a plurality of elongated slots therein; and cap screws extending through said elongated slots and threaded in said opposed walls.

6. A gear reducer in accordance with claim 5 in which said slots and cap screws are arranged to restrict adjustment of said worm in a solely radial direction along the radial axis of said gear.

7. In a gear reducer;
a housing;
a worm gear rotatably mounted in said housing;
a worm shaft extending through said housing provided between its ends with a worm arranged for meshing engagement with said worm gear;
bearing supports for the opposite ends of said worm shaft;
means for adjustably mounting said bearing supports on opposed walls of said housing for moving said worm in a solely radial direction with respect to said worm gear for substantially adjusting the center distance therebetween as wear occurs to effect full meshing engagement therebetween with zero backlash;

said worm gear having involute teeth and said worm having an involute thread; and the addendum of the teeth of said worm gear and the addendum of the thread of said worm being sufficiently smaller than the dedendum thereof to provide a clearance permitting said substantial adjustment and permitting the teeth of said worm gear to roll out of the thread of said worm without binding.

8. A gear reducer in accordance with claim 7, wherein the relation of the addendum of the worm gear teeth and worm thread with respect to their dedendum is such as to provide a clearance substantially greater than the clearance as determined by the conventional formula, $$\text{clearance} = \frac{.157}{\text{diametral pitch}}$$

9. A gear reducer in accordance with claim 7, wherein the relation of the addendum of the worm gear teeth and worm thread with respect to their dedendum is such as to provide a clearance at least about 30% greater than the clearance as determined by the conventional formula, $$\text{clearance} = \frac{.157}{\text{diametral pitch}}$$

References Cited

UNITED STATES PATENTS

| 2,771,169 | 11/1956 | Wahlstrom | 74—396 X |
| 3,220,277 | 11/1965 | Dixon | 74—409 X |
| 3,347,110 | 10/1967 | Wilson | 74—409 X |

LEONARD H. GERIN, Primary Examiner

U.S. Cl. X.R.

74—396, 458